(12) United States Patent
Nagae

(10) Patent No.: US 6,947,667 B2
(45) Date of Patent: Sep. 20, 2005

(54) CAMERA

(75) Inventor: Ryuichi Nagae, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/781,019

(22) Filed: Feb. 18, 2004

(65) Prior Publication Data

US 2004/0165875 A1 Aug. 26, 2004

(30) Foreign Application Priority Data

Feb. 25, 2003 (JP) ........................................ 2003-047107

(51) Int. Cl.[7] ............................................ G03B 17/00
(52) U.S. Cl. ........................................ 396/84; 396/379
(58) Field of Search ............................ 396/84, 85, 373, 396/379

(56) References Cited

U.S. PATENT DOCUMENTS 5,923,907 A * 7/1999 Onda ........................... 396/79

FOREIGN PATENT DOCUMENTS

| JP | H9(1997)-211300 | 8/1997 |
|----|-----------------|--------|
| JP | 2001-324749 | 11/2001 |

* cited by examiner

*Primary Examiner*—David M. Gray
(74) *Attorney, Agent, or Firm*—Cowan, Liebowitz & Latman, P.C.

(57) ABSTRACT

The present invention discloses a camera capable of reducing the size by reducing the range of movement of a view finder driving member which operates interlocked with an image-taking lens barrel. The camera includes an image-taking lens barrel which performs a operation in a collapse region and performs a zooming operation in an image-taking region, a view finder optical system including a movable lens unit and a view finder driving member having a cam which drives the movable lens unit. The image-taking lens barrel operates interlocked with the view finder driving member in the image-taking region and the interlock between the image-taking lens barrel and the view finder driving member is released in the collapse region.

10 Claims, 11 Drawing Sheets

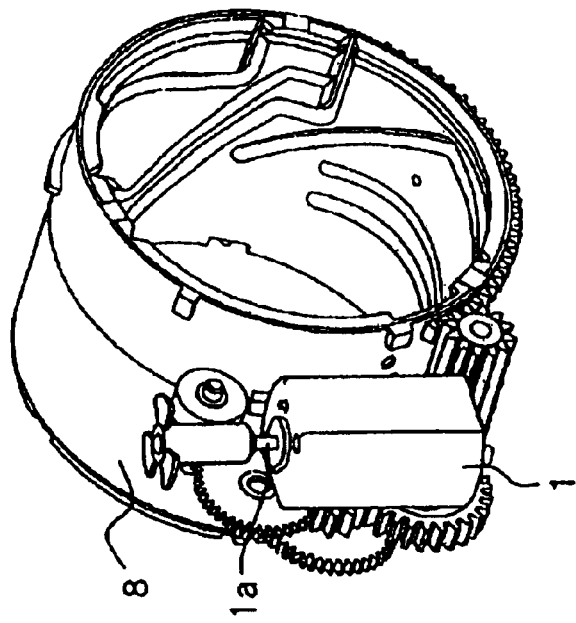
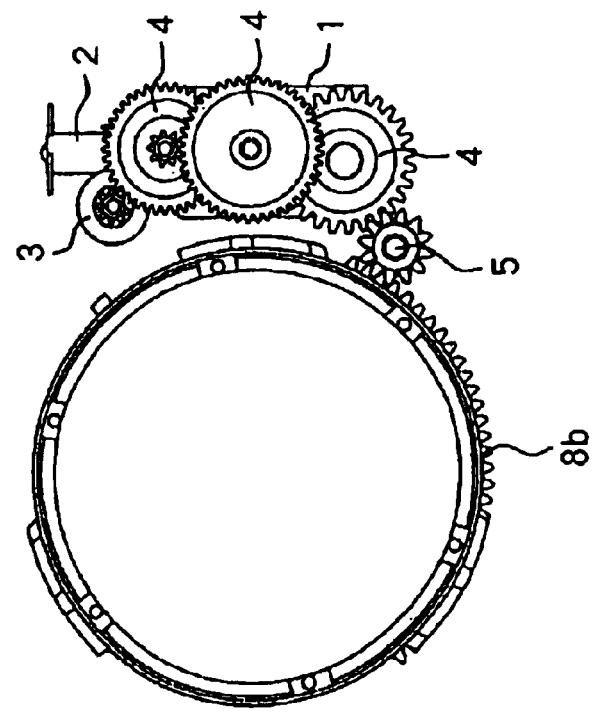

CAMERA

BACKGROUND OF THE INVENTION

1. Field of the Invention

The present invention relates to a camera which drives a view finder interlocked with operation of a lens barrel.

2. Description of the Related Art

A camera which drives a view finder interlocked with rotation operation of a rotary cylinder which is constituting a lens barrel is conventionally proposed (see Japanese Patent Laid-Open No. H09(1997)-211300, Japanese Patent Laid-Open No. 2001-324749). Such a camera is shown in FIG. 10 and FIG. 11.

In these figures, reference numeral 60 denotes a rotary cylinder which is constituting a lens barrel and 170 denotes a view finder driving member. The view finder driving member 170 is placed in such as way as to be able to contact the rotary cylinder 60 which rotates around a optical axis and according to a contact with the rotary cylinder 60, the view finder driving member 170 rotates around the optical axis (direction opposite to the D direction) together with the rotary cylinder 60.

Furthermore, the view finder driving member 170 is energized in the direction opposite to the D direction by a spring member (not shown). For this reason, when the rotary cylinder 60 rotates in the D direction, the view finder driving member 170 rotates in the D direction against the spring energy from the spring member following the rotary cylinder 60 and moves up to the position indicated by the dashed line.

The operation of such a view finder driving member 170 is shown in FIG. 8. The view finder driving member 170 contacts the rotary cylinder 60 at position c which is shifted from a wide-angle end W toward a telephoto side of a zoom position and starts a rotation operation.

When power is OFF, a field of vision of the view finder is set closer to the wide-angle side than the wide-angle end W and when the rotary cylinder 60 rotates up to the position corresponding to the wide-angle end W, the field of vision of the view finder is set so as to reach the wide-angle end W.

The view finder driving member 170 driven at point c moves along dashed line a→solid line f and the field of vision of the view finder is set appropriately according to each zoom position. However, in the above described example, the driving start position of the view finder driving member 170 is set more on the wide-angle side than the wide-angle end W of the field of vision of the view finder, and therefore the range of the rotation angle of the view finder driving member 170 increases.

Then, as shown in FIG. 11, a area between dashed line B and dashed line C of an edge portion of the view finder driving member 170 sticks out in the lateral direction of the camera. For this reason, other members which is constituting the camera (for example, a battery chamber, etc., for loading a power supply battery) need to be placed to a left of dashed line B, which represses miniaturization of the camera.

SUMMARY OF THE INVENTION

It is an object of the present invention to provide a camera capable of miniaturization by reducing a moving range of a view finder driving member which operates interlocked with an image-taking lens barrel.

In order to attain the above described object, one aspect of the camera of the present invention includes an image-taking lens barrel which performs an operation in a collapse region and performs a zooming operation in an image-taking region, a view finder optical system including a movable lens unit and a view finder driving member having a cam which drives the movable lens unit. The view finder driving member is driven interlocked with the image-taking lens barrel. Then, the image-taking lens barrel operates interlocked with the view finder driving member in the image-taking region and the interlock between the image-taking lens barrel and the view finder driving member is released in the collapse region.

The features of the camera of the invention will become more apparent from the following detailed description of a preferred embodiment of the invention with reference to the drawings.

BRIEF DESCRIPTION OF THE DRAWINGS

FIG. 5(A) and FIG. 5(B) illustrate a driving mechanism of a rotary cylinder of the above described lens barrel respectively;

DETAILED DESCRIPTION OF THE PREFERRED EMBODIMENTS

With reference now to an attached drawings, a camera which is an embodiment of the present invention will be explained below. Here, FIG. 1 shows a camera which is an embodiment of the present invention and FIG. 2 shows a lens barrel of the camera which is the embodiment of the present invention.

Figure 1:
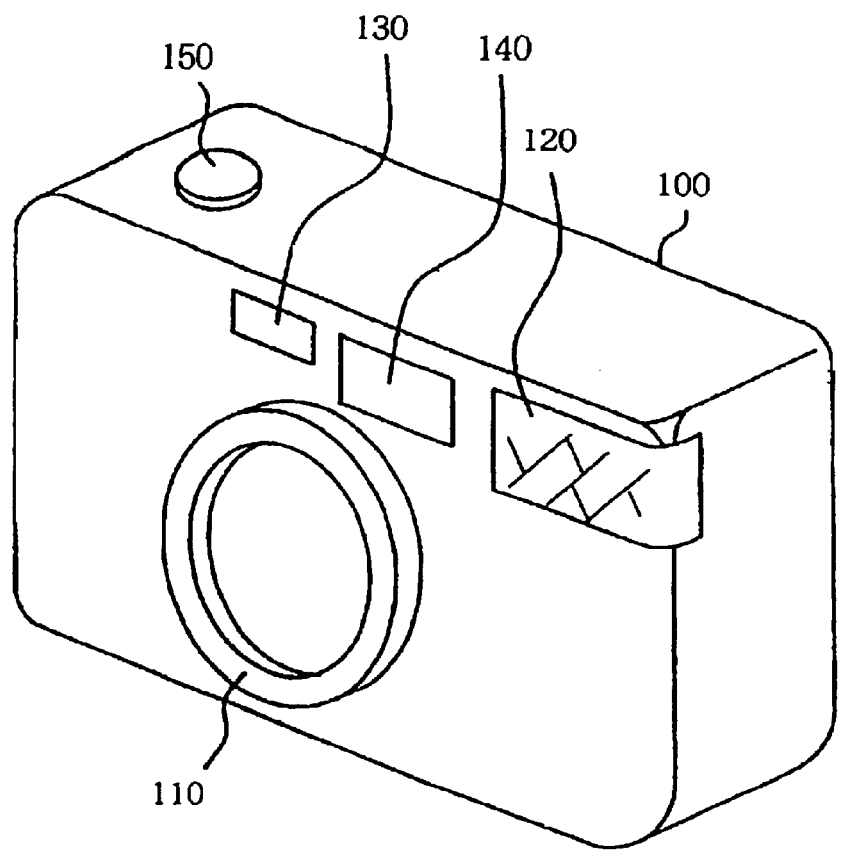
FIG. 1 is a perspective view of a camera which is an embodiment of the present invention.
Figure 2:
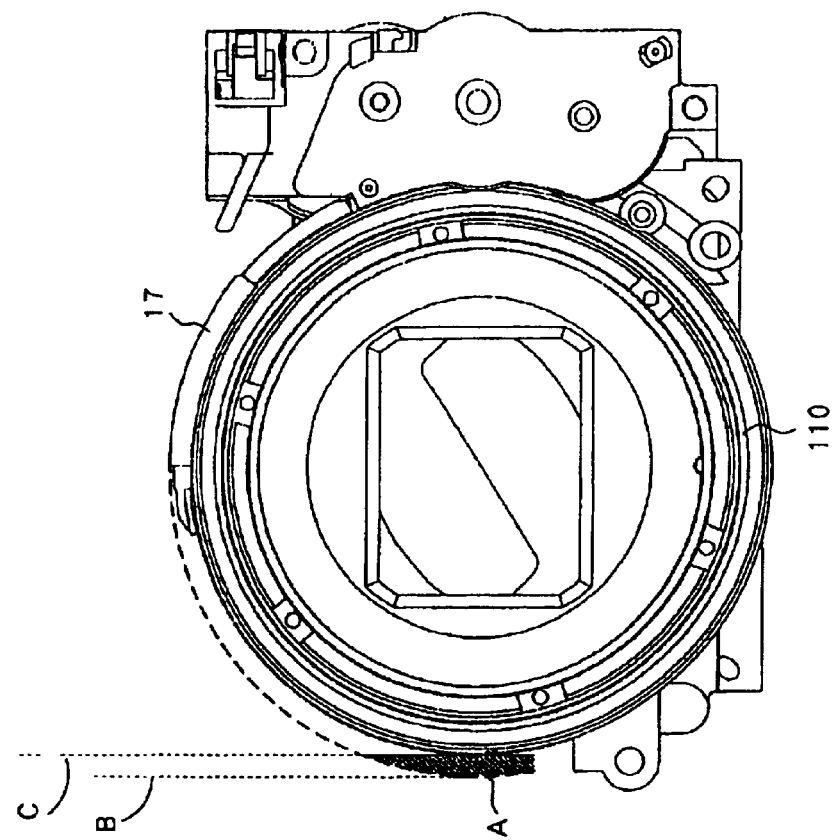
FIG. 2 is a front view of a lens barrel provided on the camera of this embodiment.

In FIG. 1, reference numeral 100 denotes a camera body and a lens barrel 110 having a zooming function is provided in a center of a front of this camera body 100. Furthermore, a light-emitting window portion 120 constituting an electronic flash apparatus which irradiates an object with illumination light is provided on a right side of the front of the camera body 100 and a view finder window 140 and a photometric window 130 are provided to a left of the light-emitting window portion 120.

Furthermore, a release button 150 is provided at a top of the camera body 100 for starting an image-taking preparation operation (focusing modification operation and photometric operation) and image-taking operation (exposure to light by an image-pickup element such as a film, CCD, CMOS sensor, etc.).

Figure 3:
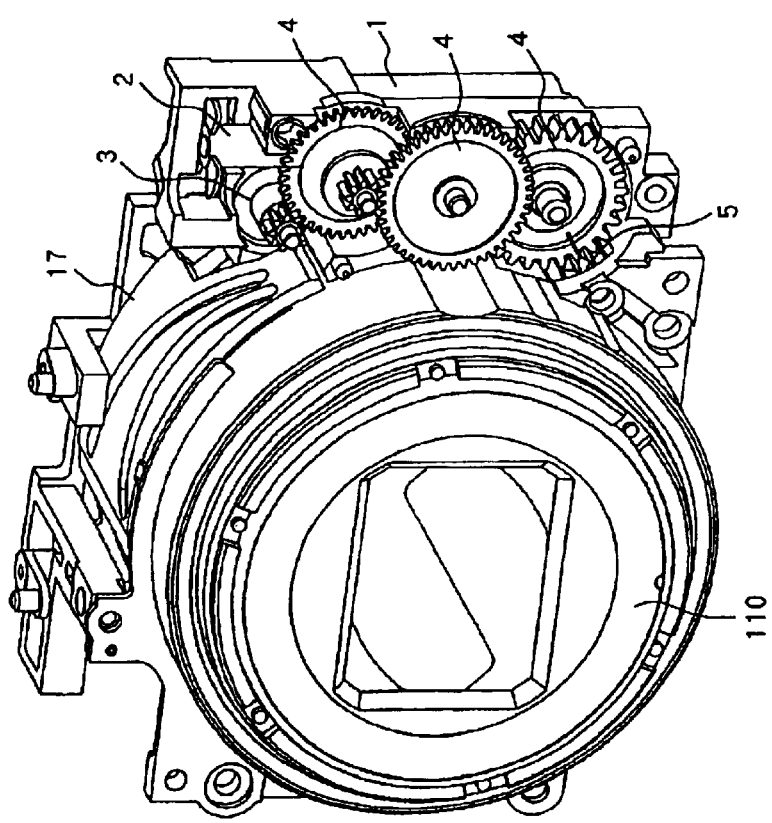
FIG. 3 is a perspective view of a lens barrel of this embodiment.

Then, the driving mechanism of a lens barrel 110 of the present invention will be explained using FIG. 3. Reference numeral 1 denotes a motor, 2 to 5 denote driving force transmission members (gears) which transmit the driving force of the motor 1 to the lens barrel 110. Reference numeral 2 denotes a worm gear attached to the motor 1. Reference numeral 3 denotes a worm wheel which engages with the worm gear 2 and is also provided with a gear portion which engages with a lens barrel driving gear 4. Reference numeral 5 denotes a final gear which drives the lens barrel 110 with the lens barrel driving gear 4. Reference numeral 17 denotes a view finder driving member for driving the view finder lens.

Figure 4:
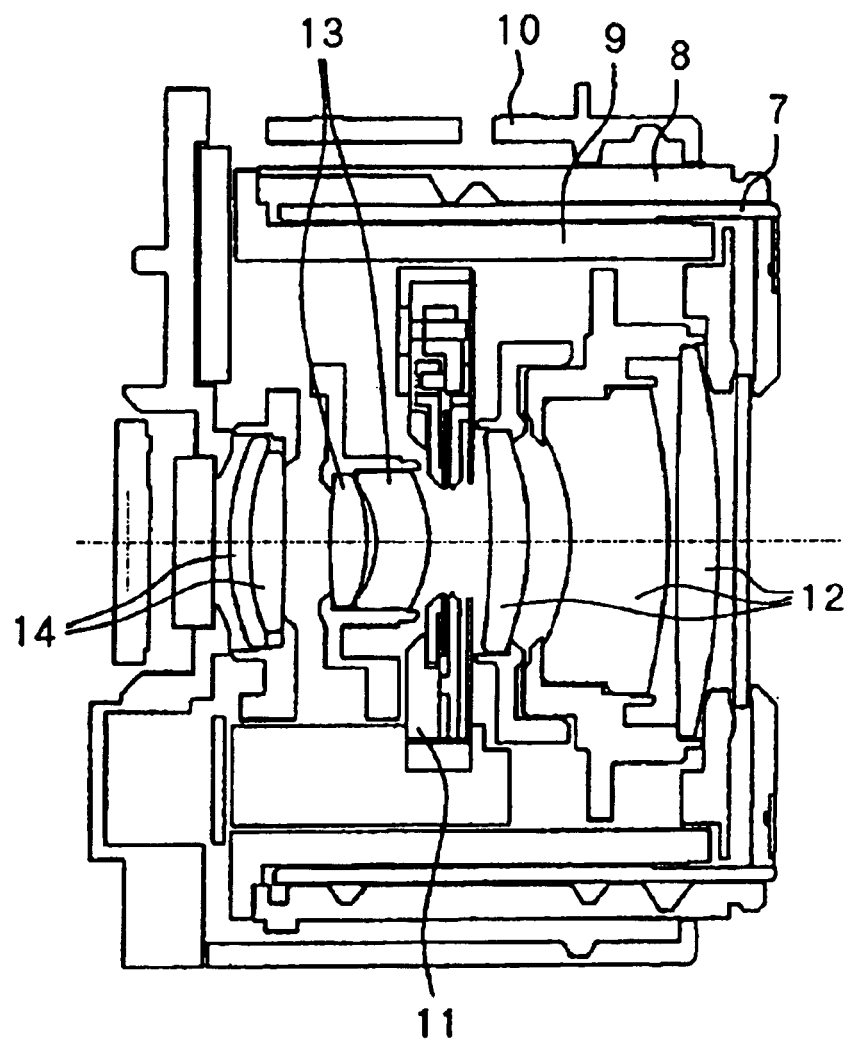
FIG. 4 is a sectional view of a lens barrel of this embodiment.

FIG. 4 is a sectional view of the center of the lens barrel 110. In FIG. 4, reference numeral 7 denotes a first rectilinearly moving cylinder and this first rectilinearly moving cylinder 7 load a first image-taking lens unit 12.

Reference numeral 8 denotes a rotary cylinder and a cam groove portion (not shown) which guides the first rectilinearly moving cylinder 7 and a second image-taking lens unit 13 in the direction of the optical axis is formed on the inner surface of this rotary cylinder 8. A gear 8b which extends in the circumferential direction of the rotary cylinder 8 is provided on the outer surface of the rotary cylinder 8. This gear 8b engages with the final gear 5.

Reference numeral 9 denotes a second rectilinearly moving cylinder which guides rectilinearly the first rectilinearly moving cylinder 7 and is supported on the rotary cylinder 8 in a rotatable manner. Reference numeral 10 denotes a fixed cylinder and a cam groove portion (not shown) which engages with a cam pin (not shown) provided on the rotary cylinder 8 is formed in this fixed cylinder 10.

Reference numeral 11 denotes a shutter unit for controlling exposure to light, which is driven together with a second image-taking lens unit 13. Reference numeral 12 denotes a first image-taking lens unit, 13 denotes a second image-taking lens unit and 14 denotes a third image-taking lens unit.

The operation of the lens barrel 110 will be explained using FIG. 5. When the motor 1 is driven, this driving force is transmitted in order of the worm gear 2→worm wheel 3→lens barrel driving gear 4→final gear 5→gear 8b, and the rotary cylinder 8 moves forward or backward in the direction of the optical axis while rotating around the optical-axis.

When the rotary cylinder 8 rotates, the first rectilinearly moving cylinder 7 and the second rectilinearly moving cylinder 9 move forward or backward in the direction of the optical axis without rotating around the optical axis. The second image-taking lens unit 13 and shutter unit 11 also move forward or backward in the direction of the optical axis without rotating around the optical axis in the like manner.

Figure 6:
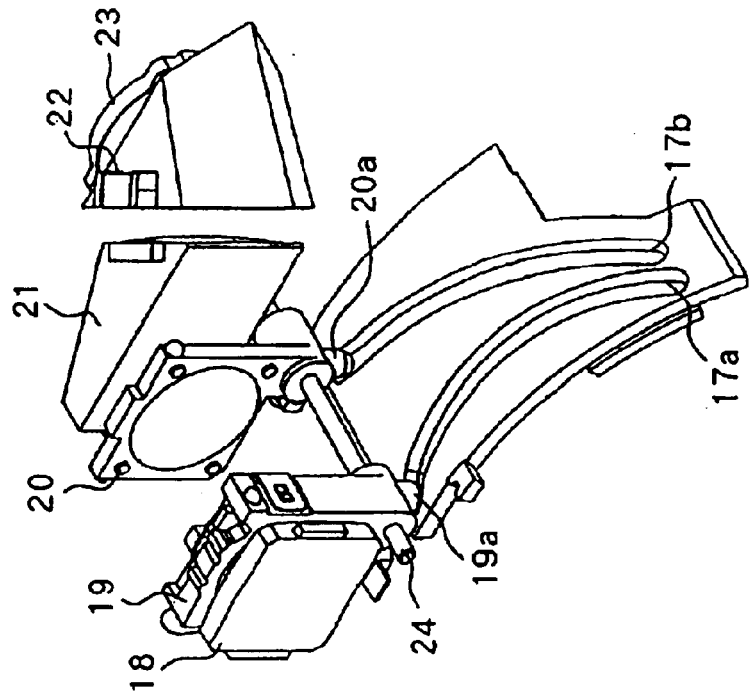
FIG. 6(A) and FIG. 6(B) illustrate a driving mechanism of a view finder provided in the camera of this embodiment respectively.
Figure 6:
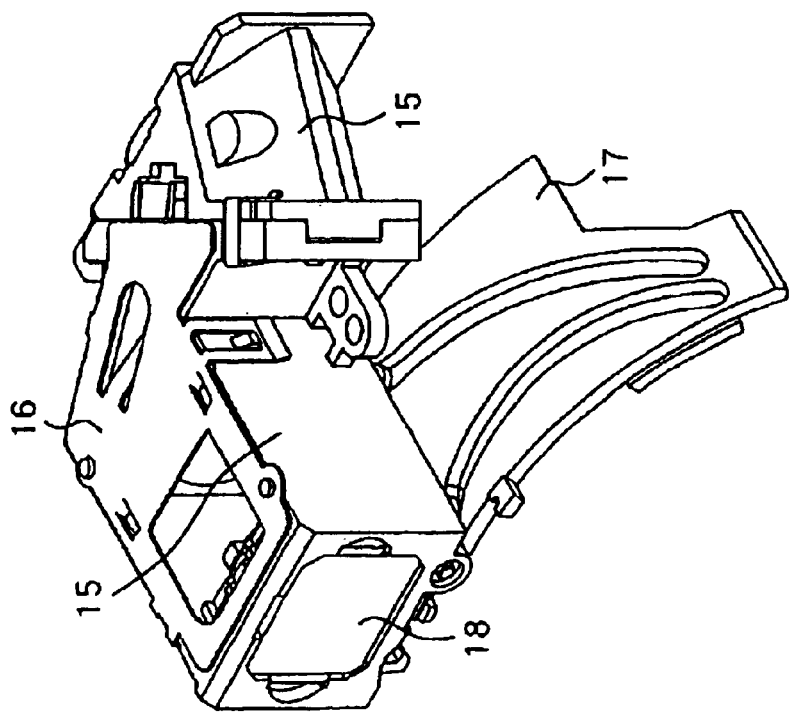

Then, the structure and driving of a view finder will be explained using FIG. 6. FIG. 6(B) omits a view finder holding member 15 in FIG. 6(A) for simplicity of explanation.

In FIG. 6(A) and FIG. 6(B), reference numeral 15 denotes a view finder holding member and this view finder holding member 15 holds a first view finder lens unit 18, a second view finder lens unit 19, a third view finder lens unit 20, a first prism 21, a second prism 22 and an eye piece lens 23.

The top of the view finder holding member 15 is covered with a view finder cover 16. A first cam groove portion 17a and a second cam groove portion 17b are formed in the view finder driving member 17. The view finder driving member 17 rotates along a periphery of the lens barrel 110.

The first cam groove portion 17a engages with a cam pin 19a provided at the bottom of the second view finder lens unit 19 and the second cam groove portion 17b engages with a cam pin 20a provided at the bottom of the third view finder lens unit 20. The second view finder lens unit 19 and third view finder lens unit 20 are supported on a rectilinear guide shaft 24 which will be described later in such a way as to be movable forward or backward in the direction of the optical axis.

Figure 7:
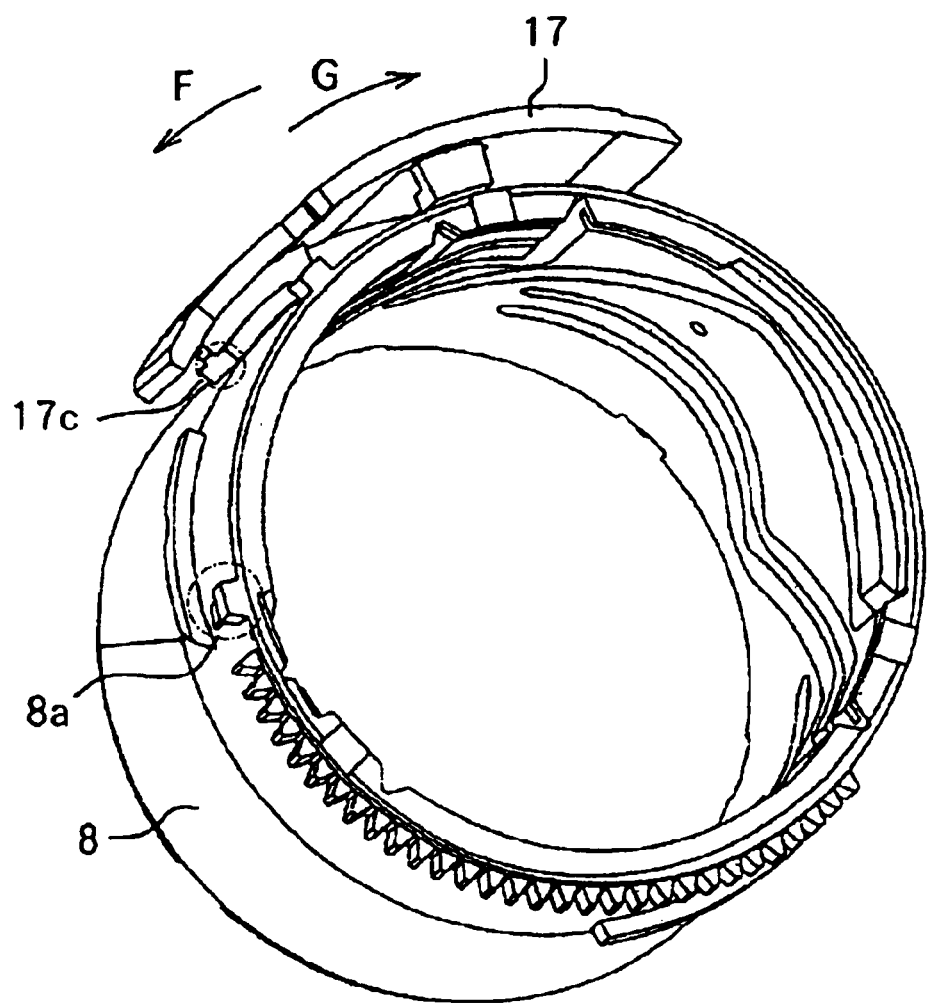
FIG. 7 illustrates the driving mechanism of the view finder.

Then, the relationship between the rotary cylinder 8 and view finder driving member 17 will be explained using FIG. 7. FIG. 7 shows a state in which the rotary cylinder 8 (that is, lens barrel 110) is at a position corresponding to power OFF (collapsed position). In this state, a view finder driving portion 8a provided on the rotary cylinder 8 is separate from a contact portion 17c of the view finder driving member 17.

When the motor 1 is driven from this state and the rotary cylinder 8 is rotated in the G direction up to a position just before a first middle position M1 which will be described below beyond the wide-angle end W (hereinafter referred to as "view finder driving portion 8a driving start position"), the view finder driving portion 8a provided on this rotary cylinder 8 contacts the contact portion 17c of the view finder driving member 17.

Here, the view finder driving member 17 is energized in the F direction opposite to the G direction by a spring (not shown). Therefore, the view finder driving member 17 starts a rotation operation together with the rotary cylinder 8 in the G direction against the spring force of the spring and rotates until the lens barrel 110 stops at a predetermined zoom position.

When the rotary cylinder 8 is rotated in the F direction from the state after this rotation, the view finder driving member 17 receives the spring force in the F direction from the spring, and therefore rotates in the F direction following the rotary cylinder 8. Then, after the rotary cylinder 8 returns to the driving start position, the view finder driving portion 8a separates from the contact portion 17c of the view finder driving member 17.

As described above, the first cam groove portion 17a engages with the cam pin 19a of the second view finder lens unit 19, the second cam groove portion 17b engages with the cam pin 20a of the third view finder lens unit 20 and the second view finder lens unit 19 and third view finder lens unit 20 are guided in the direction of the optical axis by the rectilinear guide shaft 24.

Therefore, when the view finder driving member 17 rotates in the G direction, the second view finder lens unit 19 and the third view finder lens unit 20 move in the direction of the optical axis along the first cam groove portion 17a and the second cam groove portion 17b.

Figure 8:
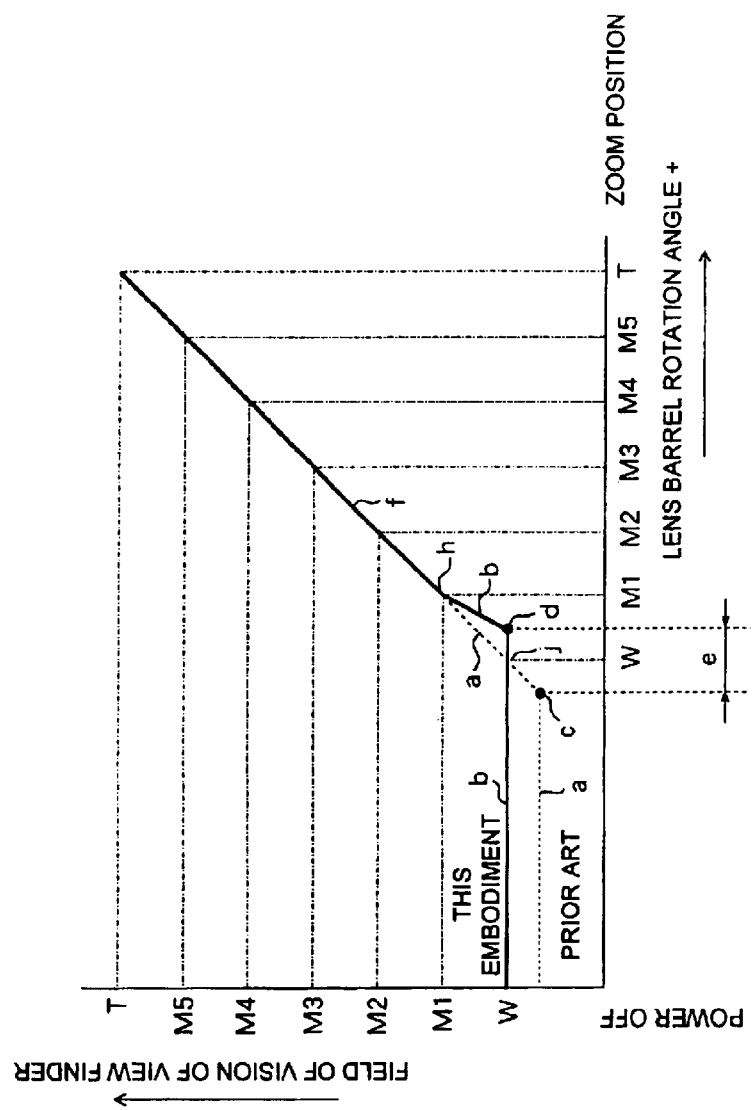
FIG. 8 illustrates a relationship between a field of vision of the view finder and a zoom position.

Then, the relationship between a rotation angle of the lens barrel 110 and a field of vision of the view finder will be explained with reference to FIG. 8. FIG. 8 shows data when a step zoom is adopted, but the present invention is also applicable to a camera using any mechanism other than the step zoom.

In FIG. 8, the horizontal axis shows a zoom position of the lens barrel 110, W denotes the wide-angle end, M1 to M5 denote a first middle position to a fifth middle position set sequentially from the wide-angle side to the telephoto side, T denotes the telephoto end. Furthermore, the vertical axis shows the field of vision of the view finder corresponding to each zoom position, that is, the rotation position of the view finder driving member 17.

An area to the left of the wide-angle end W is a collapse region, which is the area between the position at which the lens barrel 110 is housed in the camera body and the wide-angle end W. Then, an area on a right is a image-taking region, which is the area between the wide-angle end W at which the lens barrel 110 protrudes from the camera body and the telephoto end T.

Here, because of backlash in the components, the lens barrel 110 may stop on a right of the wide-angle end W or a left of the wide-angle end W. In this case, an area on the right of the position at which the lens barrel 110 has stopped is called an image-taking position and an area on the left is called a collapse position. That is, in this specification, the terms "image-taking region" and "collapse region" are used as expressions including a certain degree of errors.

The lens barrel 110 operates in the collapse region and the image-taking region. In this embodiment, as indicated by solid line b, the field of vision of the view finder when the lens barrel 110 is in the collapse region is set to a substantially constant the field of vision of W (wide-angle end) and the driving start time of the view finder driving member 17 is set to point d.

That is, the field of vision of the view finder when the zoom position is from the collapse position to the wide-angle end W is set to a substantially constant. Then, between the wide-angle end W and the first middle position Ml, the view finder driving portion 8a provided on the rotary cylinder 8 is contacted with the contact portion 17c of the view finder driving member 17. The driving of the finder driving member 17 is started. That is to say, the change of the angle of view of the finder starts from an intermediate position (d) between the wide-angle end W and the first middle position M1 during a zoom operation from the wide-angle end W toward the telephoto end T.

In other words, when the zoom position is in the collapse region, after passing point d, the view finder driving member 17 rotates up to the first middle position M1 along solid line b. Since the field of vision of the view finder is set appropriately at the wide-angle end W and the first middle position M1, the user does not misrecognize the image-taking region.

After passing point h, the view finder driving member 17 moves along solid line f, and the field of vision of the view finder is set appropriately at each zoom position (second middle position M2, third middle position M3, fourth middle position M4, fifth middle position M5, telephoto end T).

Furthermore, during a zoom operation from the telephoto side toward the wide-angle end W, the change of the angle of view of the finder stops at the intermediate position (d) between the first middle position (MI) and the wide-angle end W. Then, the angle of view of the finder is kept substantially constant from the intermediate position to the collapse position.

In this way, this embodiment can repress the view finder driving member 17 from rotating by an amount of rotation corresponding to an amount of variation e of the zoom position compared to the conventional example (dashed line in FIG. 8) without affecting the field of vision of the view finder. Therefore, the rotation angle range of the view finder driving member 17 can be made smaller than the conventional case.

Then, as the range of the rotation angle of the view finder driving member 17 decreases, the length of the groove of the cam groove portion 17a and cam groove portion 17b can be shortened, and therefore it is possible to provide a compact camera with a smaller view finder driving member 17.

In this embodiment, driving of the view finder driving member 17 is started between the wide-angle end W and the first middle position M1, but to reduce the range of the rotation angle of the view finder driving member 17, it is also possible to use a method of starting the driving of the view finder driving member 17, for example, between the first middle position M1 and the second middle position M2.

However, because the field of vision of the view finder at the first middle position M1 is set to the wide-angle position as in the case where it is in a collapse position, the field of vision of the view finder requires a field of vision frame dedicated to the first middle position Ml to repress misrecognition by the user.

Therefore, this embodiment adopts a structure in which the driving of the view finder driving member 17 is started between the wide-angle end W and the first middle position Ml to provide a camera which would not give the user any sense of incongruity.

Furthermore, when components have backlash, if the driving start position of the view finder driving member 17 is set to point j, that is, the position corresponding to the wide-angle end, the field of vision of the view finder when the lens barrel 110 is at the position of the wide-angle end W may not be set at the position of the wide-angle end W. This corresponds to the case where when, for example, the lens barrel 110 stops at the wide-angle end W, it stops closer to the first middle position M1 than the original stop position due to backlash. Then, the view finder may also move to the original stop position.

In contrast, this embodiment drives the view finder driving member 17 with a sufficient distance so that there will be no influence of backlash between the wide-angle end W which is a position shifted from the wide-angle end W toward the telephoto side and the first middle position M1, and therefore even if the above described backlash occurs, it is possible to reliably set the field of vision of the view finder to W when the view finder driving member 17 is at the wide-angle end W.

Figure 9:
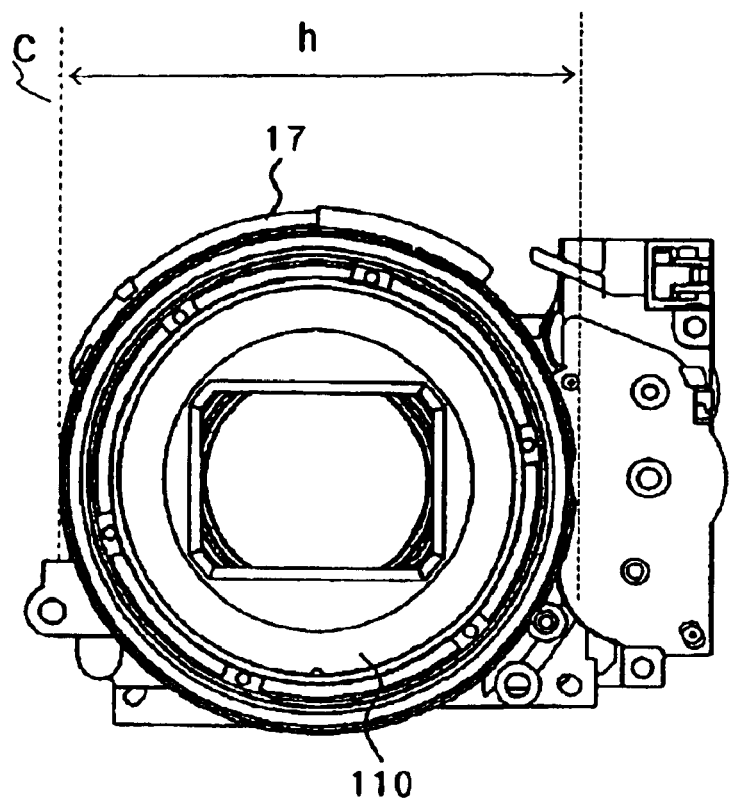
FIG. 9 is a front view of a lens barrel of the camera of this embodiment in a collapsed position.
Figure 10:
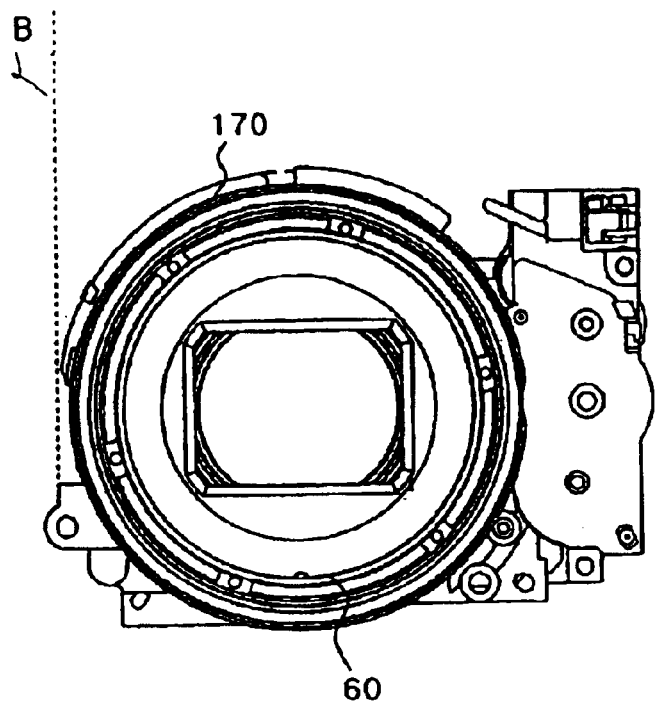
FIG. 10 is a front view of a lens barrel of a conventional camera in a collapsed position.
Figure 11:
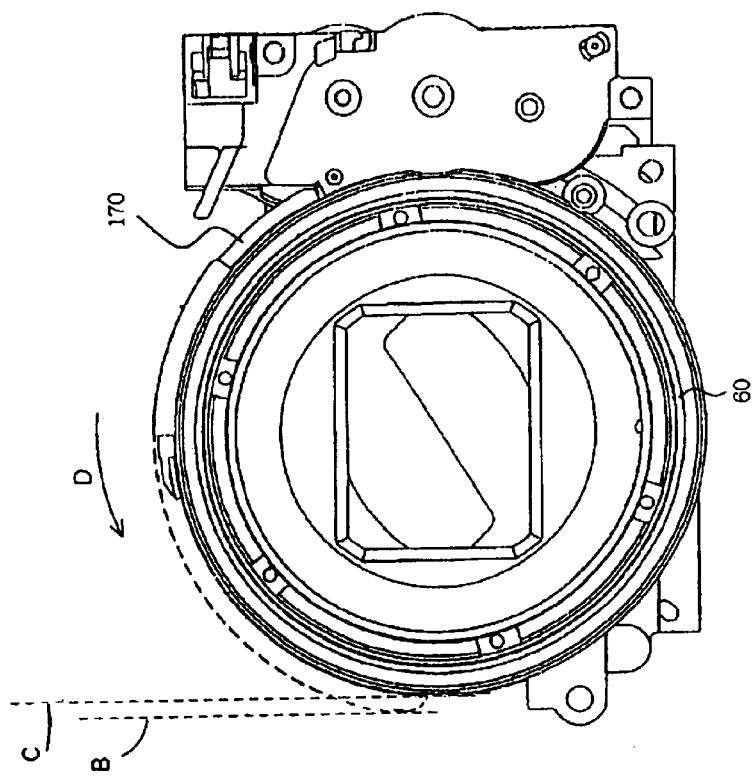
FIG. 11 is a front view of a lens barrel of a camera of a conventional example.

The state in which the camera having the above described structure is at the telephoto end is shown in FIG. 9. As is apparent when compared with FIG. 10 which is a conventional example, the camera according to this embodiment is constructed in such a way that the driving range of the view finder driving member 17 falls within the range of the maximum width h (diameter of the lens barrel) in the diameter direction of the lens barrel 110 to reduce the size of the camera. That is, when the view finder driving member 17 is driven, the edge of the view finder driving member 17 never sticks out to the left of the lens barrel 110.

FIG. 2 allows such features of this embodiment to be grasped at first glance. As shown in FIG. 2, it is possible to reduce the size of the view finder driving member 17 compared to the conventional example, by the area A sandwiched between dashed line B and dashed line C of the edge portion of the view finder driving member 170. Further, it is possible to prevent the view finder driving member 17 from rotating.

This makes it possible to place other members constituting a camera (e.g., battery chamber to load a power supply battery) using the area A between dashed line B and dashed line C and consequently reduce the size of the camera (particularly in the horizontal direction of the camera).

While preferred embodiment has been described, it is to be understood that modification and variation of the present invention may be made without departing from scope of the following claims.

What is claimed is:

1. A camera comprising:
   an image-taking lens barrel which performs an operation in a collapse region and an image-taking region;
   a view finder optical system including a movable lens unit; and
   a view finder driving member having a cam which drives the movable lens unit,
   wherein the image-taking lens barrel operates interlocked with the view finder driving member in one section of the image-taking region, and the interlock between the image-taking lens barrel and the view finder driving member is released in the collapse region and other section of the image-taking region.

2. The camera according to claim 1, wherein in the image-taking region, the interlock between the image-taking lens barrel and the view finder driving member is released in a first section on the collapse region side and the image-taking lens barrel operates interlocked with the view finder driving member in a second section other than the first section.

3. The camera according to claim 1, wherein the view finder driving member operates interlocked with the image-taking lens barrel by the engagement with a member constituting the image-taking lens barrel, and the interlock between the view finder driving member and the image-taking lens barrel is released by releasing the engagement.

4. The camera according to claim 1, wherein the view finder driving member rotates along the circumference of the image-taking lens barrel.

5. The camera according to claim 1, wherein the view finder driving member moves within a maximum width in the diameter direction of the image-taking lens barrel.

6. A camera comprising:
   an image-taking lens barrel which performs an operation between a collapse position and a first zoom position, and performs a zoom operation between the first zoom position and a second zoom position; and
   a view finder optical system whose angle of view is changed in accordance with the zoom operation,
   wherein, during the zoom operation of the image-taking lens barrel from the first zoom position toward the second zoom position, the change of angle of view of the view finder optical system starts from an intermediate position between the first and the second zoom positions.

7. The camera according to claim 6, wherein the angle of view of the view finder optical system is substantially constant during an operation of the image-taking lens barrel from the collapse position to the intermediate position.

8. A camera comprising:
   an image-taking lens barrel which performs an operation between a collapse position and a first zoom position, and performs a zoom operation between the first zoom position and a second zoom position; and
   a view finder optical system whose angle of view is changed in accordance with the zoom operation,
   wherein, during the zoom operation of the image-taking lens barrel from the second zoom position toward the first zoom position, the change of angle of view of the view finder optical system stops at an intermediate position between the second and the first zoom positions.

9. The camera according to claim 8, wherein the angle of view of the view finder optical system is substantially constant during an operation of the image-taking lens barrel from the intermediate position to the collapse position.

10. A camera comprising:
    an image-taking lens barrel which performs an operation in a collapse region and image-taking region, and can perform zoom operation; and
    a view finder optical system including a movable lens unit,
    wherein the zoom operation interlocks with the change of angle of view of the view finder optical system in one section of the image-taking region, and the interlock between the zoom operation and the change of angle of view is released in the collapse region and other section of the image-taking region.

* * * * *